(12) United States Patent
Nakamura et al.

(10) Patent No.: US 6,760,533 B2
(45) Date of Patent: Jul. 6, 2004

(54) OPTICAL ADHESIVE COMPOSITION AND OPTICAL DEVICE

(75) Inventors: Koichiro Nakamura, Osaka (JP); Takeshi Ishimaru, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/115,142

(22) Filed: Apr. 4, 2002

(65) Prior Publication Data

US 2003/0017342 A1 Jan. 23, 2003

Related U.S. Application Data

(60) Provisional application No. 60/285,689, filed on Apr. 24, 2001.

(30) Foreign Application Priority Data

Apr. 6, 2001 (JP) ........................ 2001-108193

(51) Int. Cl.$^7$ ............................... G02B 6/138
(52) U.S. Cl. .................. 385/141; 523/404; 525/524; 528/27; 528/28; 528/33
(58) Field of Search ........................... 525/524; 528/27, 528/28, 33

(56) References Cited

U.S. PATENT DOCUMENTS 5,991,493 A  11/1999 Dawes et al.
6,525,160 B1 * 2/2003 Goda ........................ 528/29

FOREIGN PATENT DOCUMENTS

| JP | 62-297369 | 12/1987 |
|---|---|---|
| JP | 6-73358 | 3/1994 |
| JP | 6-73359 | 3/1994 |
| JP | 7-5307 | 1/1995 |
| JP | 9-243870 | 9/1997 |
| JP | 11-343474 | 12/1999 |
| JP | 2000-109780 | 4/2000 |

OTHER PUBLICATIONS

Schmidt, H., et al. "Hot Melt Adhesives for Glass Containers by the Sol–Gel Process", Journal of Non–Crystalline Solids, vol. 80 (1986), pp. 557–563.

Schmidt, H., et al. "Glass Sealings by Sol–Gel Derived Organically Modified Silicates", Collected Papers, XIV Intl. Congr. on Glass (1986), pp. 429–436.

* cited by examiner

Primary Examiner—Philip Tucker
Assistant Examiner—D. E. Aylward
(74) Attorney, Agent, or Firm—Wenderoth, Lind & Ponack, L.L.P.

(57) ABSTRACT

An adhesive composition for bonding optical parts comprising (A) 3 to 60 wt % of an epoxysilane or a hydrolysis/polycondensation product thereof, (B) 5 to 90 wt % of a bisphenol type epoxy resin having a viscosity of 2,000 to 5,000 mPa·s, (C) 5 to 35 wt % of a novolak type epoxy resin, 3 to 30 wt % of a curing agent which is an amine, and water and an alcohol in an amount of 0 to 0.75 time the total number of mols of the hydrolyzable groups or atoms of the epoxysilane. This composition has excellent moisture resistance and heat resistance, suppresses the formation of bubbles during curing, is free from such a defect as opaqueness caused by bubbles and can be used for the assembly and bonding of optical parts.

8 Claims, No Drawings

OPTICAL ADHESIVE COMPOSITION AND OPTICAL DEVICE

This application claims the benefit of Provisional Application No. 60/285,689 filed Apr. 24, 2001.

FIELD OF THE INVENTION

The present invention relates to an adhesive composition and an optical device constructed by bonding together optical parts with an optically transparent adhesive layer formed therefrom.

PRIOR ART

Bonding technologies used for the assembly of optical parts and optical elements used in optical fiber communication systems must have high reliability. For the assembly of optical parts, soldering, laser welding and organic adhesives such as acrylic and epoxy resins have been used. A refractive index control precision adhesive is disclosed by (i) JP-A 6-073358 and JP-A 6-073359 (the term "JP-A" as used herein means an "unexamined published Japanese patent application"), and an organic-inorganic adhesive prepared by a sold-gel method is described in (ii) Journal of Non-Crystalline Solids, vol. 80, pp. 557–563, 1986 and (iii) Intl. Congr. On Glass, pp. 429 to 436, 1986. An optical element assembled by using a sold-gel adhesive comprising an alkoxide and a metal salt is disclosed by (iv) Japanese Patent No. 1829914 (JP-A 62-297369) and a prism assembled by using an adhesive comprising a silicic acid salt and an alkoxide is disclosed by (v) Japanese Patent No. 2786996 (JP-A 7-5307). Further, an organic-inorganic composite adhesive is disclosed by (vi) USP 5991493.

(vii) JP-A 11-343474 discloses an adhesive composition comprising an epoxy resin, organoalkoxysilane and aluminum chelating compound. (viii) JP-A 9-243870 teaches that an optical part is sealed by an optically curable resin composition material which comprises a bisphenol type epoxy resin, novolak type epoxy resin, optically acid generating agent and epoxysilane as a coupling agent. Further, (ix) JP-A 2000-109780 discloses an ultraviolet curable adhesive composition for optical parts which comprises a bisphenol A type epoxy resin, alicyclic epoxy resin, optical cationic initiator and γ-glycidoxypropyl trimethoxysilane.

However, the above bonding technologies and adhesives for optical parts have the following problems. The soldering and laser welding are unsatisfactory in terms of fixing position accuracy and need a laser light source and advanced technologies. The epoxy adhesive and acrylic adhesive (i) are inferior in heat resistance of 250° C. or more (soldering heat resistance) and moisture resistance. The adhesives comprising an alkoxide and a metal salt (ii to vii) have such a problem that an alcohol formed by a hydrolytic reaction or water formed by a dehydration reaction is gasified during curing by heating, whereby bubbles remain by bonding optical parts such as lenses, the adhesive becomes opaque, or sufficient adhesion cannot be obtained. The adhesives comprising an epoxy resin (viii, ix) are not satisfactory in terms of the heat resistance of the adhesive layers.

SUMMARY OF THE INVENTION

It is an object of the present invention to provide an adhesive composition which overcomes the above defects, has excellent moisture resistance and heat resistance, rarely generates bubbles during curing to eliminate such a defect as opaqueness caused by bubbles and can be used for the assembly and bonding of optical parts.

It is another object of the present invention to provide an optically transparent optical part which is bonded by the adhesive composition of the present invention.

Other objects and advantages of the present invention will become apparent from the following description.

According to the present invention, firstly, the above objects and advantages of the present invention are attained by an adhesive composition for bonding together optical parts, comprising:

(A) an epoxysilane represented by the following chemical formula (1) or a hydrolysis/polycondensation product thereof:

$$R_n SiX_{4-n} \qquad (1)$$

wherein R is an organic group having an epoxy bond or organic group having no epoxy bond, X is a hydrolyzable group or atom, and n is 1 or 2, with the proviso that when n is 1, R is an organic group having an epoxy bond and when n is 2, at least one of R's is an organic group having an epoxy bond;

(B) a bisphenol type epoxy resin having a viscosity of 2,000 to 5,000 mPa·s;

(C) a novolak type epoxy resin;

(D) a curing agent which is an amine; and (E) at least one of water and an alcohol, wherein the amounts of the above components (A), (B), (C) and (D) are 3 to 60 wt %, 5 to 90 wt %, 5 to 35 wt % and 3 to 30 wt % based on the total weight of the components (A), (B) and (C), respectively and the amount of the above component (E) is 0 to 0.75 time the total number of mols of the hydrolyzable groups or atoms contained in the component (A).

Secondly, the above object sand advantages of the present invention are attained by an optical device comprising at least two optically transparent optical parts and an optically transparent adhesive layer which is formed by curing the above adhesive composition of the present invention to bond together these optical parts, wherein when the refractive indices of two adjacent optical parts are represented by $n_1$ and $n_2$ ($n_1 \geq n_2$), the above adhesive layer between the adjacent optical parts satisfies a refractive index $n_3$ represented by the following expression (1):

$$\sqrt{(n_1 \cdot n_2)} - ((\sqrt{(n_1 \cdot n_2)} - n_2)/3) - 0.05 \leq n_3 \leq \sqrt{(n_1 \cdot n_2)} + ((n_1 - \sqrt{(n_1 \cdot n_2)})/3) + 0.05 \quad (1)$$

THE PREFERRED EMBODIMENTS OF THE INVENTION

The adhesive composition used in the present invention comprises the components (A), (B), (C), (D) and (E). The component (A) is a component which strengthens bonding between the surface of an adherend and an adhesive and contributes to the improvement of moisture resistance. As shown by the above chemical formula (1), when n is 1, the compound used as the component (A) is a silane compound having one organic group with an epoxy bond and three hydrolyzable groups or atoms, or a hydrolysate or polycondensate thereof. When n is 2, a silane compound having one or two organic groups with an epoxy bond and two hydrolyzable groups or atoms or having one organic group with an epoxy bond and one organic group without an epoxy bond such as an alkyl group, aryl group or alkenyl group or a hydrolysis/polycondensation product thereof is used. An epoxysilane of the above chemical formula (1) in which n is 1, or a hydrolysis/polycondensation product thereof having excellent heat resistance and moisture resistance is obtained advantageously. Examples of the organic group having an epoxy bond include glycidoxypropyl group and 3,4-epoxycyclohexyl group. The glycidoxypropyl group and 3,4-epoxycyclohexyl group are preferably used because they are easily acquired. The hydrolyzable group is, for example, an alkoxyl group. Out of these, an alkoxyl group having 1 to 4 carbon atoms is preferred. The hydrolyzable atom is, for example, a halogen atom. Chlorine atom is preferred as the halogen atom. Preferred examples of the silane compound represented by the above chemical formula (1) include 3-glycidoxypropyl trimethoxysilane, 3-glycidoxypropyl triethoxysilane, 2-(3,4-epoxycyclohexyl)ethyl trimethoxysilane, 2-(3,4-epoxycyclohexyl)ethyl triethoxysilane, 3-glycidoxypropylmethyl dimethoxysilane, 3-glycidoxypropylmethyl diethoxylsilane, di(3-glycidoxypropyl)diethoxysilane, di(3-glycidoxypropyl)dimethoxysilane and hydrolysis/polycondensation products thereof.

The component (A) may be a silane compound represented by the above chemical formula (1) or a hydrolysis/polycondensation product thereof. When the hydrolysis/polycondensation product is used, a reaction is preferably carried out while an alcohol and water by-produced by the reaction are distilled off to ensure that the adhesive composition should not contain water and the alcohol substantially. When the component (A) is a silane compound represented by the above chemical formula (1) and the amount thereof is too large, the viscosity of the obtained adhesive composition becomes too low, resulting in deteriorated coatability. Meanwhile, when the amount is too small, the effect of improving moisture resistance cannot be obtained fully. When the component (A) is a hydrolysis/polycondensation product of the silane compound represented by the above chemical formula (1) and the amount thereof is too large, the viscosity of the composition becomes too high and the amounts of an alcohol and water by-produced by hydrolysis become relatively large, whereby the obtained cured product becomes porous or opaque disadvantageously. Meanwhile, when the amount is too small, the effect of improving moisture resistance cannot be obtained fully. Therefore, the amount of the component (A) is 3 to 60 wt %, preferably 6 to 50 wt %, more preferably 8 to 40 wt % based on 100 wt % of the total of the components (A), (B) and (C).

The bisphenol type epoxy resin as the component (B) is a component for forming the basic skeleton of an adhesive layer. By controlling the molecular weight of the bisphenol type epoxy resin, that is, the chemical structure thereof, the viscosity of the adhesive composition is set to 2,000 to 5,000 mPa·s. Within this viscosity range, the adhesive composition can be applied easily. Preferred examples of the component (B) include bisphenol A type epoxy resins, bisphenol F type epoxy resins and bisphenol S type epoxy resins. Out of these, bisphenol F type epoxy resins are preferred. When the amount of the component (B) is too large, heat resistance and moisture resistance lower and when the amount is too small, the compatibility of the component (B) with other components lowers. The amount of the component (B) is 5 to 90 wt %, preferably 20 to 80 wt %, more preferably 40 to 75 wt % based on 100 wt % of the total of the components (A), (B) and (C).

The component (C) is a component for improving the heat resistance of the adhesive layer. When the amount of the component (C) is too large, the viscosity of the adhesive composition becomes too high and when the amount is too small, the heat resistance is not improved fully. Therefore, the amount of the component (C) is 5 to 35 wt %, preferably 8 to 30 wt %, more preferably 12 to 28 wt % based on 100 wt % of the total of the components (A), (B) and (C).

The amine as the component (D) is a curing catalyst for polymerizing the epoxy bonds of the components (A), (B) and (C) and also serves as a hydrolytic catalyst for the component (A). Examples of the component (D) include primary amines, secondary amines and tertiary amines such as diethylenetriamine, triethylenetetramine, polymethylenediamine, methaphenilene diamine, methaphenilene diamine, diaminodiphenylmethane, imidazole, 2-methylimidazole and 2-ethyl-4-methylimidazole. Out of these, imidazoles, that is, imidazole, 2-methylimidazole and 2-ethyl-4-methylimidazole are preferred because they have excellent reactivity. The amount of the component (D) is 3 to 30 wt %, preferably 4 to 25 wt %, more preferably 5 to 20 wt % based on 100 wt % of the total of the components (A), (B) and (C).

Preferably, the adhesive composition of the present invention do not contain a large amount of a volatile component such as an alcohol or water. When the adhesive composition contains a volatile component, the obtained cured product may become porous or opaque. When a hydrolysis/polycondensation product of an epoxysilane is used as the component (A), it is preferred to reduce the contents of water and an alcohol in the component (A), that is, the adhesive composition as much as possible by carrying out a reaction while the by-produced alcohol and water are distilled off so as to prepare the hydrolysis/polycondensation product. When an unhydrolyzed epoxysilane is used as the component (A), water must be contained in the adhesive composition for the hydrolysis of this epoxysilane. Therefore, it is preferred to contain water in the adhesive composition in an amount of 0.5 to 0.75 time the total number of mols of the hydrolyzable groups or atoms of the epoxysilane. This water does not need to be added and water contained in the components (B) and (C) as an impurity suffices. When the hydrolysis and dehydration reaction of the epoxysilane occurs in the adhesive composition, part of water contained changes to an alcohol. Therefore, water and/or an alcohol as the component (E) is contained in the adhesive composition in an amount of 0 to 0.75 time the total number of mols of the hydrolyzable groups or atoms (the total of the number of mols of the groups and the number of mols of the atoms when both are contained) of the epoxysilane. More specifically, the total content of the alcohol and water contained in the adhesive composition is preferably maintained at 1 wt % or less, more preferably 0.1 wt % or less.

In the present invention, the contents of the epoxysilane, bisphenol type epoxy resin and novolak type epoxy resin in the adhesive composition are adjusted such that the refractive index value of the adhesive layer should approximate to the refractive index values of at least two optically transparent optical parts metioned above. More specifically, when the refractive indices of the two adjacent optical parts are represented by $n_1$ and $n_2$ ($n_1 \geq n_2$), the adhesive layer between the adjacent optical parts preferably has a refractive index $n_3$ represented by the above expression (1), more preferably a refractive index $n_3$ represented by the following expression (2).

$$\sqrt{(n_1 \cdot n_2)} - ((\sqrt{(n_1 \cdot n_2)} - n_2)/10) - 0.01 \leq n_3 \leq \sqrt{(n_1 \cdot n_2)} + ((n_1 - \sqrt{(n_1 \cdot n_2)})/10) + 0(2).$$

For example, when an optical fiber having a refractive index ($n_2$) of 1.46 and a microlens having a refractive index ($n_1$) of 1.59 are to be bonded together, $1.452 \leq n_3 \leq 1.596$ according to the expression (1) and $1.507 \leq n_3 \leq 1.540$ according to the expression (2). By adjusting the refractive index, an optical device having a small light propagation loss is thus obtained. As for bonding of optical fibers, lenses, filters, optical waveguides, diffraction gratings and optically active elements, optical devices having a small light propagation loss are obtained by adjusting the refractive index similarly.

A description is subsequently given of the optical parts of the present invention. The optical parts used in the present invention include optical fibers, lenses, filters, optical waveguides, diffraction gratings and optically active elements. The optical fibers include a single-mode optical fiber and multi-mode optical fiber. The lenses include a refractive index distribution lens, spherical lens, non-spherical lens and plane-convex lens. The optical filters include a narrow-band filter made from a dielectric multi-layer film, band-pass filter and polarization filter. The optical waveguides include a single-mode optical waveguide and multi-mode optical waveguide. These optical waveguides may have a Bragg diffraction grating with a periodically modulated refractive index. The materials constituting these optical parts include glass materials, plastic materials, and organic-inorganic composite materials.

The materials constituting the above optical parts preferably have a linear expansion coefficient of $1.5 \times 10^{-5}/°$ C. or less. When the linear expansion coefficient is larger than $1.5 \times 10^{-5}/°$ C., in the case of a plastic optical part having a high thermal expansion coefficient of 9 to $15 \times 10^{-5}/°$ C. such as polypropylene, delamination may occur between the optical part and the adhesive layer in the heating step after the application of an adhesive or the adhesive layer may crack. Ordinary inorganic glass has a linear expansion coefficient of $1.5 \times 10^{-5}/°$ C. or less. At least the bonding surface of an optical part is preferably made from an oxide. If the bonding surface is not made from an oxide, the adhesion strength of the adhesive layer lowers in the molding step and delamination occurs between the surface to be bonded and the adhesive layer as the case may be. Preferred examples of the material of the optical part include oxide glass such as silicate-based glass, boric acid-based glass and phosphoric acid-based glass, quartz, ceramics, epoxy resins and glass fiber reinforced polystyrene. Out of these, oxide glass and quartz are preferred because they have a refractive index of 1.40 to 1.55, high transparency and a low expansion coefficient. Although a metal is not bonded by the adhesive layer of the present invention as it is, if the surface of a metal is treated with an oxidizing agent, it may be used as a part to be bonded.

When these optical parts are assembled together, the optically transparent adhesive composition of the present invention is applied to be filled or spread between a first optical part and a second optical part and then cured to form a bonding portion having predetermined strength. As for the curing of the adhesive, an adhesive composition which cures in a few minutes can be obtained by increasing the amount of a curing agent as the component (D). By reducing the amount of the curing agent, an adhesive composition having a pot life of several hours can be obtained. The curing time can be shortened by heating as required. A reaction retardant and a curing accelerator may be added as required in an amount of 40 wt % or less, preferably 30 wt % or less based on the total amount. The curing time can be controlled freely by adding a reaction retardant or a curing accelerator. After the adhesive composition is applied, it is generally maintained at room temperature to 250° C. for several seconds to several hours to be cured.

EXAMPLES

Preparation of Raw Material (Chief Raw Material 1)

0.1 g of 2-(3,4-epoxycyclohexyl)ethyl trimethoxysilane, 0.75 g of bisphenol F type epoxy resin (Toto Kasei Co., Ltd., YDF-170, epoxy equivalent: 160 to 180 g/eq., viscosity: 2,000 to 5,000 mPa·s) and 0.25 g of novolak type epoxy resin (Toto Kasei Co., Ltd., YDPN-638, epoxy equivalent: 170 to 190 g/eq, water content: 1% or less) were added and stirred to obtain a chief raw material 1.

(Chief Raw Material 2)

A chief raw material 2 was obtained in the same manner as the chief raw material 1 except that the amount of 2-(3,4-epoxycyclohexyl)ethyl trimethoxysilane was changed from 0.1 g to 0.25 g.

(Chief Raw Material 3)

A chief raw material 3 was obtained in the same manner as the chief raw material 1 except that the amount of 2-(3,4-epoxycyclohexyl)ethyl trimethoxysilane was changed from 0.1 g to 0.5 g.

(Chief Raw Material 4)

3 g of isopropanol and 1 g of an aqueous hydrochloric acid solution having a concentration of 0.1 mol/l were mixed with 5 g of 2-(3,4-epoxycyclohexyl)ethyl trimethoxysilane and stirred at room temperature for 24 hours to obtain a hydrolysis/polycondensation product A. An alcohol and water by-produced were removed by heating this hydrolysis polycondensation product at 80° C. under a reduced pressure of 30 mmHg to obtain about 4.5 g of a concentrated hydrolysis/polycondensation product B. A chief raw material 4 was obtained in the same manner as the chief raw material 1 except that 0.1 g of this concentrated hydrolysis/polycondensation product B was used in place of 0.1 g of 2-(3,4-epoxycyclohexyl)ethyl trimethoxysilane. When the amounts of the residual alcohol and water were determined by gas chromatography, the chief raw material 4 contained 0.1 wt % or less of volatile components based on the total weight.

(Chief Raw Material 5)

A chief raw material 5 was obtained in the same manner as the chief raw material 1 except that the same amount of 3-glycidoxypropyl trimethoxysilane was used in place of 2-(3,4-epoxycyclohexyl)ethyl trimethoxysilane.

(Chief Raw Material 6)

A chief raw material 6 was obtained in the same manner as the chief raw material 4 except that 0.33 g of the hydrolysis/polycondensation product A containing water and an alcohol and obtained in the course of the preparation of the main raw material 4 was used in place of the concentrated hydrolysis/polycondensation product B. When the amounts of the residual alcohol and water were determined by gas chromatography, the chief raw material 6 contained about 50 wt % of volatile components (water+ alcohol) based on the total weight. This total weight of water and alcohol was 2.5 times the total number of mols of the hydrolyzable groups (methoxyl groups) of 2-(3,4-epoxycyclohexyl)ethyl trimethoxysilane as the component A.

(Chief Raw Material 7)

A chief raw material 7 was obtained in the same manner as the chief raw material 1 except that 2-(3,4-epoxycyclohexyl)ethyl trimethoxysilane was not used.

(Chief Raw Material 8)

A chief raw material 8 was obtained in the same manner as the chief raw material 1 except that the amount of 2-(3,4-epoxycyclohexyl)ethyl trimethoxysilane was changed from 0.1 g to 2 g.

(Curing Agent)

1.1 g of 2-ethyl-4-methylimidazole and 0.68 g of imidazole were mixed together and heated at 100° C. for 1 hour to obtain a curing agent.

(Adhesive Compositions 1 to 8)

100 mg of the chief raw material 1 and 10 mg of the curing agent were mixed together to obtain an adhesive composition 1. Similarly, 100 mg of the chief raw materials 2 to 8 and 10 mg of the curing agent were mixed together to obtain adhesive compositions 2 to 8, respectively.

Examples 1 to 5

10 mg of each of the above adhesive compositions 1 to 5 was dropped on a first slide glass sheet (25 mm×50 mm×1.2 mm) and a second slide glass sheet which was the same in size as the above glass sheet was placed upon this first slide glass sheet so that the adhesive composition was sandwiched between the two slide glass sheets to be spread to a size of 25 mm×25 mm. Then, the slide glass sheets were heated at 200° C. on a hot plate for 15 minutes to observe the appearance of the adhesive layer to check the formation of air bubbles and the opaqueness of the layer. Meanwhile, 1 g of each of the adhesive compositions was placed in a 3-ml glass sample bottle and heated at 200° C. for 30 minutes to measure the volume of the adhesive composition before and after heating to evaluate the volume shrinkage factor of the adhesive composition represented by 100×(volume before heating−volume after heating)/(volume before heating).

Each of the adhesive compositions 1 to 5 was used to bond together one ends of two quartz glass rods having a diameter of 2 mm and a length of 1 mm by curing at 150° C. for 30 minutes to prepare a sample for an adhesive strength test.

After a moisture resistance test A and a moisture resistance test B were carried on this sample, the adhesive strength of the sample was measured. The moisture resistance test A was carried out by boiling the sample in boiled water for 24 hours and the moisture resistance test B was carried out by boiling the sample in boiled water for 24 hours and further keeping the sample in a thermostatic oven maintained at 85° C. and a relative humidity of 85% for 500 hours. Before and after the moisture resistance tests, a tensile test under a load of 10 N and a load of 1 N was carried out by grasping the both end portions of the bonded quartz glass rods to check whether the bonded surfaces of the quartz glass rods were separated from each other. The samples prepared by using the above adhesive compositions 1 to 5 were designated as Examples 1 to 5, respectively.

As a result of the above tests, the formation of bubbles was not observed during a heat treatment and the volume shrinkage was less than 2% in Examples 1 to 5. As for adhesive strength before and after the moisture resistance test A and the moisture resistance test B, Examples 1 to 5 all showed an adhesive strength of 10N or more. In the adhesive strength column of Table 1, "◯" means an adhesive strength of 10 N or more, "Δ" means an adhesive strength of less than 10 N and 1 N or more and "X" means an adhesive strength of less than 1 N.

Comparative Examples 1 to 3

For the adhesive compositions 6 to 8, the appearances of the adhesive layers were observed, the volume shrinkage factors were evaluated and the adhesive strengths before and after moisture resistance tests were measured in the same manner as in Examples 1 to 5. Samples prepared by using the adhesive compositions 6 to 8 were designated as Comparative Examples 1 to 3, respectively. In Comparative Example 1, air bubbles were formed from the centers to the ends of the glass sheets during a heat treatment for the evaluation of the appearance of the adhesive layer. The volume shrinkage factor was about 10%. In contrast to this, in Comparative Examples 2 and 3, the formation of bubbles was not observed during a heat treatment and the volume shrinkage factor was less than 3%. As for the adhesive strength before and after the moisture resistance test A and the moisture resistance test B, Comparative Examples 2 and 3 had an adhesive strength of 10 N or more before the moisture resistance tests but the adhesive strength declined to less than 1 N after the moisture resistance test A and the moisture resistance test B as shown in Table 1.

TABLE 1

| | Example No. | composition No. | components (wt %) | | | | before moisture resistance test | adhesive strength after moisture resistance test A | after moisture resistance test B |
|---|---|---|---|---|---|---|---|---|---|
| | | | A | B | C | D | | | |
| Ex. | 1 | 1 | 9.1 | 68.2 | 22.7 | 10.0 | ◯ | ◯ | ◯ |
| | 2 | 2 | 20.0 | 60.0 | 20.0 | 10.0 | ◯ | ◯ | ◯ |
| | 3 | 3 | 33.3 | 50.0 | 16.7 | 10.0 | ◯ | ◯ | ◯ |
| | 4 | 4 | 9.1 | 68.2 | 22.7 | 10.0 | ◯ | ◯ | ◯ |
| | 5 | 5 | 9.1 | 68.2 | 22.7 | 10.0 | ◯ | ◯ | ◯ |
| C.Ex. | 1 | 6 | 16.7 | 62.5 | 20.8 | 10.0 | — | — | — |
| | 2 | 7 | 0 | 75.0 | 25.0 | 10.0 | ◯ | X | X |
| | 3 | 8 | 66.7 | 25.0 | 8.3 | 10.0 | ◯ | X | X |

Ex.: Example
C.Ex.: Comparative Example
moisture resistance test A: 24 hours of boiling
moisture resistance test B: 85° C. (temperature) and 85% (relative humidity), 500 hours
adhesive strength: "◯" for 10 N or more, "Δ" for less than 10 N and 1 N or more, "X" for less than 1 N Examples 6 to 10

(Optical Fiber)

An about 50 cm long glass single-mode optical fiber (clad diameter: 120 μm, core diameter: 10 μm, core refractive index: 1.46, clad refractive index: 1.44) was prepared as an optical part.

(Lens)

A glass microlens (SelfocMicrolens SMC18 of Nippon Sheet Glass Co., Ltd.), diameter: 1.8 mm, length: 4.43 mm (0.23 pitch, center refractive index: 1.590, distribution coefficient g=0.326, 1pitch (=2π/g)=19.27 mm) was prepared as an optical part.

The refractive index values of the above optical fiber (core) and lens (center portion) and the refractive index values after curing of the above adhesive compositions 1 to 5 are shown in Table 2 and Table 3.

TABLE 2

| optical part | refractive index |
|---|---|
| optical fiber (core) | 1.46 |
| lens (center portion) | 1.59 |

TABLE 3

| adhesive cured product | refractive index |
|---|---|
| adhesive composition 1 | 1.527 |
| adhesive composition 2 | 1.525 |
| adhesive composition 3 | 1.523 |
| adhesive composition 4 | 1.528 |
| adhesive composition 5 | 1.524 |

Bonding of Optical Parts (Bonding Lens and Optical Fiber, Fabrication of Collimator Module)

One end of the above optical fiber was inserted into a cylindrical glass ferrule having a length of 4 mm, an outer diameter of 1.8 mm and an inner diameter of 130 μm and the gap between them was filled with each of the above adhesive compositions 1 to 5 and heated at 150° C. for 30 minutes to cure the adhesive composition to bond together the optical fiber and the ferrule. This ferrule with the fiber and the above glass microlens (SMC18) were centered on an optical bench and laser light having a wavelength of 1,550 nm was input from the other end of the optical fiber, let pass through the ferrule side end of the optical fiber and focused on the above lens through an about 250 μm air gap to construct a first collimator system by positioning the lens to ensure that the loss value became the minimum. A second collimator system based on the same specifications as the first collimator system was constructed by arranging a lens on the opposite side to the lens of the first collimator system. Each of the above adhesive compositions 1 to 5 (the same adhesive composition as that used for bonding together the optical fiber and the ferrule) was applied between the lens and the ferrule of the first collimator system, the optical fiber and the ferrule were centered again to ensure that the loss value became the minimum, and the adhesive composition was thermally cured at room temperature for 2 hours or by blowing 110° C. hot air with a drier for about 20 minutes to fabricate a collimator module. The initial value of optical output when the lens and the ferrule were not bonded together and there was a space therebetween and the value of optical output after bonding by the adhesive curing were measured and shown in Table 4. Collimator modules obtained by using the adhesive compositions 1 to 5 were designated as Examples 6 to 10 corresponding to the adhesive composition numbers. It is understood from Table 4 that the optical loss of each of the collimator modules (Examples 6 to 10) obtained by bonding the lens and the ferrule with each of the adhesive compositions 1 to 5 were very small.

TABLE 4

| Example | adhesive | initial output | output after curing adhesive |
|---|---|---|---|
| 6 | 1 | 11.7 dB · m | 11.3 dB · m |
| 7 | 2 | 11.7 dB · m | 11.2 dB · m |
| 8 | 3 | 11.7 dB · m | 11.4 dB · m |
| 9 | 4 | 11.7 dB · m | 11.3 dB · m |
| 10 | 5 | 11.7 dB · m | 11.3 dB · m |

As described above, according to the present invention, there are obtained an adhesive composition which has excellent adhesive strength, a low light transmission loss and excellent moisture resistance by preventing the formation of bubbles and shrinkage during the curing of the adhesive and an optical device constructed by bonding optical parts by the adhesive composition.

What is claimed is:

1. An adhesive composition for bonding optical parts, comprising:
   (A) an epoxysilane represented by the following chemical formula (1) or a hydrolysis/polycondensation product thereof:

$$R_n SiX_{4-n} \quad (1)$$

wherein R is an organic group having an epoxy bond or organic group having no epoxy bond, X is a hydrolyzable group or atom, and n is 1 or 2, with the proviso that when n is 1, R is an organic group having an epoxy bond and when n is 2, at least one of R's is an organic group having an epoxy bond;
   (B) a bisphenol epoxy resin having a viscosity of 2,000 to 5,000 mPa·s;
   (C) a novolak epoxy resin;
   (D) a curing agent which is an amine; and
   (E) optionally at least one of water and an alcohol, wherein each of the amounts of the above components (A), (B), (C) and (D) is 3 to 60 wt %, 5 to 90 wt %, 5 to 35 wt % and 3 to 30 wt % based on the total weight of the components (A), (B) and (C), respectively and the amount of the above component (E) is 0 to 0.75 time the total number of mols of the hydrolyzable groups or atoms contained in the component (A).

2. The adhesive composition of claim 1, wherein the component (A) is an epoxysilane of the formula (1) in which n is 1.

3. The adhesive composition of claim 1, wherein the component (B) is a bisphenol F epoxy resin.

4. The adhesive composition of claim 1, wherein the component (D) is an imidazole.

5. An optical device comprising at least two optically transparent optical parts and an optically transparent adhesive layer which is formed by curing the adhesive composition of any one of claims 1 to 4 to bond together these optical parts, wherein when the refractive indices of two adjacent optical parts are represented by $n_1$ and $n_2$ ($n_1 \geq n_2$), the above adhesive layer between the adjacent optical parts satisfies a refractive index $n_3$ represented by the following expression (1):

$$\sqrt{(n_1 \cdot n_2)} - ((\sqrt{(n_1 \cdot n_2)} - n_2)/3) - 0.05 \leq n_3 \leq \sqrt{(n_1 \cdot n_2)} + ((n_1 - \sqrt{(n_1 \cdot n_2)})/3) + 0.05 \quad (1).$$

6. An optical device comprising at least two optically transparent optical parts and an optically transparent adhesive layer which is formed by curing the adhesive composition of any one of claims 1 to 4 to bond together these optical parts, wherein when the refractive indices of two adjacent optical parts are represented by $n_1$ and $n_2$ ($n_1 \geq n_2$), the above adhesive layer between the adjacent optical parts satisfies a refractive index $n_3$ represented by the following expression (2)

$$\sqrt{(n_1 \cdot n_2)} - ((\sqrt{(n_1 \cdot n_2)} - n_2)/10) - 0.01 \leq n_3 \leq \sqrt{(n_1 \cdot n_2)} + ((n_1 - \sqrt{(n_1 \cdot n_2)})/10) + 0.01 \quad (2).$$

7. The optical device of claim 5, wherein the optical parts are each an optical fiber, lens, filter, optical waveguide, diffraction grating or optically active element.

8. The optical device of claim 6, wherein the optical parts are each an optical fiber, lens, filter, optical waveguide, diffraction grating or optically active element.

* * * * *